US008327131B1

(12) United States Patent
Hardjono et al.

(10) Patent No.: US 8,327,131 B1
(45) Date of Patent: Dec. 4, 2012

(54) METHOD AND SYSTEM TO ISSUE TRUST SCORE CERTIFICATES FOR NETWORKED DEVICES USING A TRUST SCORING SERVICE

(75) Inventors: Thomas Parasu Hardjono, Portland, OR (US); David Maurits Bleckmann, Portland, OR (US); William Wyatt Starnes, Portland, OR (US); Bradley Douglas Andersen, Tigard, OR (US)

(73) Assignee: Harris Corporation, Melbourne, FL (US)

( * ) Notice: Subject to any disclaimer, the term of this patent is extended or adjusted under 35 U.S.C. 154(b) by 1333 days.

(21) Appl. No.: 11/776,498

(22) Filed: Jul. 11, 2007

Related U.S. Application Data

(63) Continuation-in-part of application No. 11/608,742, filed on Dec. 8, 2006, which is a continuation-in-part of application No. 11/288,820, filed on Nov. 28, 2005, now Pat. No. 7,272,719.

(60) Provisional application No. 60/807,180, filed on Jul. 12, 2006, provisional application No. 60/631,449, filed on Nov. 29, 2004, provisional application No. 60/631,450, filed on Nov. 29, 2004, provisional application No. 60/637,066, filed on Dec. 17, 2004.

(51) Int. Cl.
*H04L 9/32* (2006.01)
(52) U.S. Cl. ........ 713/156; 713/155; 713/175; 713/181; 726/2; 726/3; 726/4; 726/5; 726/6
(58) Field of Classification Search .......... 713/155–159, 713/175, 181; 726/2–6
See application file for complete search history.

(56) References Cited

U.S. PATENT DOCUMENTS

| 5,465,299 A | 11/1995 | Matsumoto et al. |
| 5,535,276 A * | 7/1996 | Ganesan ........................ 713/155 |

(Continued)

FOREIGN PATENT DOCUMENTS

WO    WO0048063    8/2000

(Continued)

OTHER PUBLICATIONS

Liu et al., "A Dynamic Trust Model for Mobile Ad Hoc Networks", May 26, 2004, IEEE, Proceedings of the 10th IEEE Internation Workshop on Future Trends of Distributed Computing Systems (FTDCS'04), pp. 80-85.

*Primary Examiner* — Yin-Chen Shaw
(74) *Attorney, Agent, or Firm* — Marger Johnson & McCollom PC

(57) ABSTRACT

A target machine can be verified prior to being granted access to a resource on a network by interrogating and analyzing digests of various elements of the target machine. The digests can be collected into an integrity report and provided to a Trust Scoring Service. The Trust Scoring Service receives the integrity report and compares the digests with signatures stored in a signature database. A trust score certificate can then be issued to the target machine. The Trust Scoring Service can include a Score Evaluation Server which can interact with a Kerberos Authentication Server and a Ticket Granting Server to embed a trust score within a Kerberos Ticket to enforce a richer set of access policies. The integrity of a web server can be verified and a Trust Score Certificate Logo can be displayed on a corresponding home page of a merchant. By clicking on the Trust Score Certificate Logo, a user can verify the integrity of the merchant's web servers prior to completing a transaction with the merchant.

4 Claims, 4 Drawing Sheets

U.S. PATENT DOCUMENTS

| | | | |
|---|---|---|---|
| 5,919,257 A | 7/1999 | Trostle | |
| 6,157,721 A | 12/2000 | Shear et al. | |
| 6,209,091 B1 | 3/2001 | Sudia et al. | |
| 6,289,460 B1 | 9/2001 | Hajmiragha | |
| 6,327,652 B1* | 12/2001 | England et al. | 713/2 |
| 6,393,420 B1 | 5/2002 | Peters | |
| 6,470,448 B1 | 10/2002 | Kuroda et al. | |
| 6,609,200 B2 | 8/2003 | Anderson et al. | |
| 6,823,454 B1 | 11/2004 | Hind et al. | |
| 6,826,690 B1 | 11/2004 | Hind et al. | |
| 6,922,782 B1 | 7/2005 | Spyker et al. | |
| 6,950,522 B1* | 9/2005 | Mitchell et al. | 380/280 |
| 6,976,087 B1 | 12/2005 | Westfall et al. | |
| 6,978,366 B1 | 12/2005 | Ignatchenko et al. | |
| 7,003,578 B2 | 2/2006 | Kanada et al. | |
| 7,024,548 B1 | 4/2006 | O'Toole, Jr. | |
| 7,100,046 B2 | 8/2006 | Balaz et al. | |
| 7,114,076 B2* | 9/2006 | Callaghan | 713/182 |
| 7,178,030 B2 | 2/2007 | Scheidt et al. | |
| 7,188,230 B2 | 3/2007 | Osaki | |
| 7,233,942 B2* | 6/2007 | Nye | 1/1 |
| 7,268,906 B2 | 9/2007 | Ruhl et al. | |
| 7,272,719 B2 | 9/2007 | Bleckmann et al. | |
| 7,310,817 B2 | 12/2007 | Hinchliffe et al. | |
| 7,350,204 B2 | 3/2008 | Lambert et al. | |
| 7,383,433 B2* | 6/2008 | Yeager et al. | 713/157 |
| 7,457,951 B1 | 11/2008 | Proudler et al. | |
| 7,461,249 B1* | 12/2008 | Pearson et al. | 713/156 |
| 7,574,600 B2* | 8/2009 | Smith | 713/168 |
| 7,581,103 B2 | 8/2009 | Home et al. | |
| 7,689,676 B2 | 3/2010 | Vinberg et al. | |
| 7,733,804 B2 | 6/2010 | Hardjono et al. | |
| 7,774,824 B2 | 8/2010 | Ross | |
| 7,793,355 B2 | 9/2010 | Little et al. | |
| 7,844,828 B2 | 11/2010 | Giraud et al. | |
| 7,877,613 B2 | 1/2011 | Luo | |
| 7,904,727 B2 | 3/2011 | Bleckmann et al. | |
| 7,987,495 B2 | 7/2011 | Maler et al. | |
| 8,010,973 B2 | 8/2011 | Shetty | |
| 8,090,939 B2* | 1/2012 | Ali et al. | 713/156 |
| 8,108,856 B2 | 1/2012 | Sahita et al. | |
| 2002/0069129 A1* | 6/2002 | Akutsu et al. | 705/26 |
| 2002/0095589 A1 | 7/2002 | Keech | |
| 2002/0144149 A1 | 10/2002 | Hanna et al. | |
| 2002/0150241 A1 | 10/2002 | Scheidt et al. | |
| 2003/0014755 A1 | 1/2003 | Williams | |
| 2003/0018890 A1* | 1/2003 | Hale et al. | 713/156 |
| 2003/0028585 A1 | 2/2003 | Yeager et al. | |
| 2003/0030680 A1* | 2/2003 | Cofta et al. | 345/864 |
| 2003/0097581 A1 | 5/2003 | Zimmer | |
| 2003/0177394 A1 | 9/2003 | Dozortsev | |
| 2004/0107363 A1* | 6/2004 | Monteverde | 713/201 |
| 2004/0172544 A1 | 9/2004 | Luo et al. | |
| 2004/0181665 A1* | 9/2004 | Houser | 713/158 |
| 2004/0205340 A1 | 10/2004 | Shimbo et al. | |
| 2005/0033987 A1 | 2/2005 | Yan et al. | |
| 2005/0048961 A1* | 3/2005 | Ribaudo et al. | 455/419 |
| 2005/0132122 A1 | 6/2005 | Rozas | |
| 2005/0138417 A1 | 6/2005 | McNerney et al. | |
| 2005/0163317 A1 | 7/2005 | Angelo et al. | |
| 2005/0184576 A1 | 8/2005 | Gray et al. | |
| 2005/0257073 A1 | 11/2005 | Bade et al. | |
| 2005/0278775 A1* | 12/2005 | Ross | 726/2 |
| 2006/0005254 A1 | 1/2006 | Ross | |
| 2006/0015722 A1* | 1/2006 | Rowan et al. | 713/166 |
| 2006/0048228 A1 | 3/2006 | Takemori et al. | |
| 2006/0074600 A1 | 4/2006 | Sastry et al. | |
| 2006/0117184 A1 | 6/2006 | Bleckmann et al. | |
| 2006/0173788 A1 | 8/2006 | Nath Pandya et al. | |
| 2007/0016888 A1 | 1/2007 | Webb | |
| 2007/0050622 A1 | 3/2007 | Rager et al. | |
| 2007/0130566 A1 | 6/2007 | van Rietschote et al. | |
| 2007/0143629 A1 | 6/2007 | Hardjono et al. | |
| 2007/0174429 A1 | 7/2007 | Mazzaferri et al. | |
| 2007/0180495 A1 | 8/2007 | Hardjono | |
| 2008/0092235 A1 | 4/2008 | Comlekoglu | |
| 2008/0126779 A1 | 5/2008 | Smith | |
| 2008/0189702 A1 | 8/2008 | Morgan et al. | |
| 2008/0256363 A1 | 10/2008 | Balacheff et al. | |
| 2009/0089860 A1 | 4/2009 | Forrester et al. | |
| 2011/0320816 A1 | 12/2011 | Yao et al. | |
| 2012/0023568 A1 | 1/2012 | Cha et al. | |

FOREIGN PATENT DOCUMENTS

| | | |
|---|---|---|
| WO | 2006058313 | 6/2006 |
| WO | WO2008/024135 A3 | 2/2008 |
| WO | WO/2008/030629 A1 | 3/2008 |
| WO | WO/2009/018366 A1 | 2/2009 |

* cited by examiner

METHOD AND SYSTEM TO ISSUE TRUST SCORE CERTIFICATES FOR NETWORKED DEVICES USING A TRUST SCORING SERVICE

RELATED APPLICATION DATA

This application claims the benefit of commonly-assigned U.S. Provisional Patent Application Ser. No. 60/807,180, titled "METHOD AND APPARATUS TO ISSUE TRUST SCORE CERTIFICATES FOR NETWORKED DEVICES USING A TRUST SCORING SERVICE", filed Jul. 12, 2006, which is hereby incorporated by reference. This application is a continuation-in-part of commonly-assigned U.S. patent application Ser. No. 11/608,742, titled "METHOD TO VERIFY THE INTEGRITY OF COMPONENTS ON A TRUSTED PLATFORM USING INTEGRITY DATABASE SERVICES", filed Dec. 8, 2006, which is a continuation-in-part of commonly-assigned U.S. patent application Ser. No. 11/288,820, titled "METHOD TO CONTROL ACCESS BETWEEN NETWORK ENDPOINTS BASED ON TRUST SCORES CALCULATED FROM INFORMATION SYSTEM COMPONENT ANALYSIS", filed Nov. 28, 2005, now U.S. Pat. No. 7,272,719, issued Sep. 18, 2007, which claims the benefit of commonly-assigned U.S. Provisional Patent Application Ser. No. 60/631,449, titled "METHOD TO HARVEST, SUBMIT, PERSIST, AND VALIDATE DATA MEASUREMENTS EMPLOYING WEB SERVICES", filed Nov. 29, 2004, commonly-assigned U.S. Provisional Patent Application Ser. No. 60/631,450, titled "METHOD TO VERIFY SYSTEM STATE AND VALIDATE INFORMATION SYSTEM COMPONENTS BY MEANS OF WEB SERVICES USING A DATABASE OF CRYPTOGRAPHIC HASH VALUES", filed Nov. 29, 2004, and commonly-assigned U.S. Provisional Patent Application Ser. No. 60/637,066, titled "METHOD TO CONTROL ACCESS BETWEEN NETWORK ENDPOINTS BASED ON TRUST SCORES CALCULATED FROM INFORMATION SYSTEM COMPONENTS", filed Dec. 17, 2004, all of which are hereby incorporated by reference.

FIELD OF THE INVENTION

This application pertains to a Trust Scoring Service to which a target machine requests a trust score evaluation and which in return obtains a Trust Score Certificate (containing a trust score value) reflecting the result of the evaluation. Core to the evaluation of the target machine is the collection of digests (hashes) of software components and data elements (as governed by an Integrity Profile at the Trust Scoring Service provider), and verification of each of those digests against known good digests values within the signature database of the Trust Scoring Service. The Trust Score Certificate can then be used by the target machine in various use-cases to prove its integrity state to a remote party in a transaction.

BACKGROUND OF THE INVENTION

In today's Internet climate, it is difficult for visitors of a particular online merchant, or other type of website, to know with any degree of certainty whether the computer servers behind the website are trustworthy. This often leads to blind trust on the part of the visitor. A lack of trust can also dissuade visitors from completing a transaction with the online merchant because of fears of unknown security hazards, computer viruses, or other threats.

One method of providing mutual authentication of both client and server computers is to implement the Kerberos protocol, which allows for relatively secure communications over insecure networks. However, as implemented today, Kerberos tickets (which serve to prove the identity of users) lack a trust score to reflect an integrity evaluation of a given client machine.

Accordingly, a need remains for a way to identify and authenticate components of a client or server platform that are in a potentially improper state before a transaction occurs by informing a user about a level of integrity of various servers of an online merchant service or other website. The present application addresses these and other problems associated with the prior art.

SUMMARY OF THE INVENTION

One embodiment of the present invention includes an authentication server to authenticate a target machine; a score evaluation server configured to receive a request for a trust score evaluation, to interrogate said target machine responsive to said request, to generate a trust score responsive to said interrogation; and a ticket granting server configured to generate a ticket, to receive said trust score from the score evaluation server, to include said trust score into said ticket, and to deliver said ticket to said target machine.

The foregoing and other features, objects, and advantages of the invention will become more readily apparent from the following detailed description, which proceeds with reference to the accompanying drawings.

DETAILED DESCRIPTION OF THE PREFERRED EMBODIMENT

To solve the problems in the prior art, an embodiment of the invention begins by setting forth a method and system for a Trust Scoring Service which issues Trust Score Certificates to evaluated machines. A target machine (e.g., client laptop, merchant servers, mobile-phones/PDA, network elements, etc.) can request a score-evaluation from the Trust Scoring Service, and is in turn evaluated by one or more Score Evaluation Servers belonging to the Trust Scoring Service.

The process of evaluation, among others, involves the collection of digests of files and data elements (as requested by the Score Evaluation Servers) on the target machine, and the reporting of these digests in a digitally-signed Integrity Report to the Score Evaluation Servers. This process is explained in greater detail in U.S. patent application Ser. No. 11/288,820, filed Nov. 28, 2005, now U.S. Pat. No. 7,272,719, issued Sep. 18, 2007, which is hereby incorporated by reference. In summary, based on the digests in the Integrity Report, the Score Evaluation Servers can verify each digest, to the extent possible, against a Signature Database (part of the Trust Scoring Service). As an outcome of the evaluation of the target machine by the Trust Scoring Service, the service issues a Trust Score Certificate, which can be digitally-signed by the Trust Scoring Service and which contains the machine identity together with a Trust Score value assigned to that machine (by the Trust Scoring Service). The machine identity can be its IP address, X.509 device certificate, or other acceptable device identities.

The Trust Score Certificate can be used by consumer-facing web servers (e.g., on-line merchants) that can display a Trust Score Logo at the bottom of the website to provide assurance to consumers. The consumer user that clicks that Trust Score Logo will be shown the Trust Score Certificate issued (digitally-signed) by the Trust Scoring Service for that given web server, as described below. The consumer can also verify that the Trust Score Certificate offered by the web server is up-to-date: that is, that the Trust Score Certificate represents the current state of the web server.

The trust scoring evaluation method can be used with the Kerberos authentication system, which contains a Ticket Granting Server (TGS) that issues a Ticket to client machines seeking access to resources on the network. In addition to authenticating the client machine, the Kerberos ticket can contain an additional field holding the Trust Score for the client machine, thereby providing the ability for the server implementing the resource to enforce a richer set of access policies based on the Trust Score value. Thus clients, like web servers, can have and use Trust Score Certificates to verify themselves to the authentication system.

Figure 1:
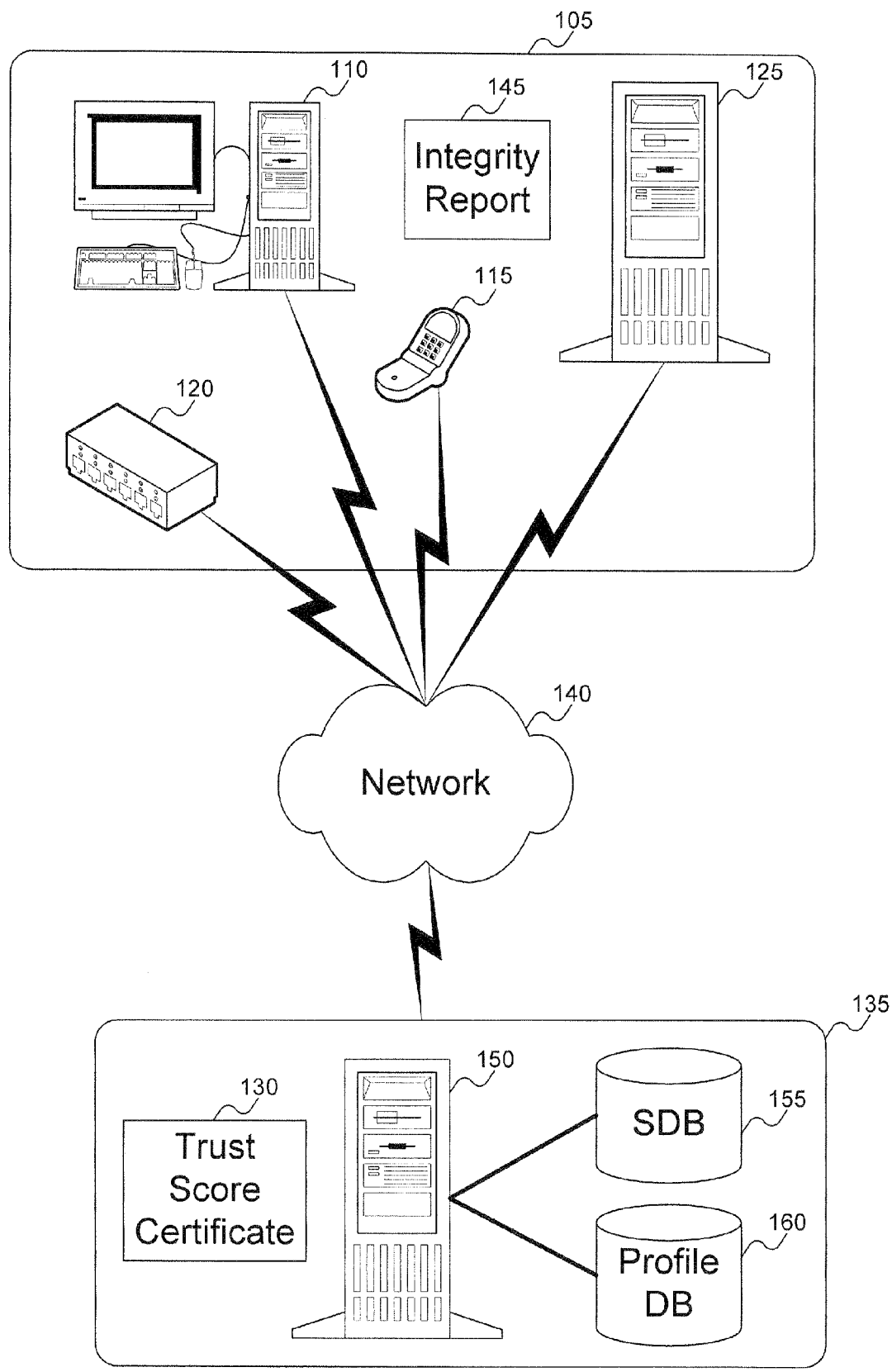
FIG. 1 shows an architecture of a Trust Scoring Service including target machines and a score evaluation server, according to an embodiment of the invention.

FIG. 1 shows a system including a Trust Scoring Service, a score evaluation server, and target machines, according to an embodiment of the invention. Target machine 105 (which can be client laptop/desktop 110, phone/PDA 115, network element 120, or server machine 125, among other possibilities) seeks to obtain a Trust Score Certificate 130 from the Trust Scoring Service 135 in order to fulfill some requirements. These requirements could range from the need to access resources on network 140 (e.g., in the case of a client machine) to the need to show a trust score level in a public-facing website (e.g., on-line merchant), as set forth below with respect to FIG. 4. Based on the digests in Integrity Report 145, Score Evaluation Server 150 can verify each digest, to the extent possible, against Signature Database 155. Signature Database 155 can be local or remote to Score Evaluation Server 150. In addition, Signature Database 155 can be a partial database; to the extent digests in Integrity Report 145 cannot be found in Signature Database 155, Score Evaluation Server 155 can access a remote database to supplement or update Signature Database 155. Score Evaluation Server 150 can also use Digest Collector software (not shown) that computes a digest of the files and data elements on target machine 105 (as determined by an Integrity Profile in Profile Database 160). A person with skill in the art will recognize that Score Evaluation Server 150 can be comprised of multiple servers, which are networked or clustered together.

Figure 2:
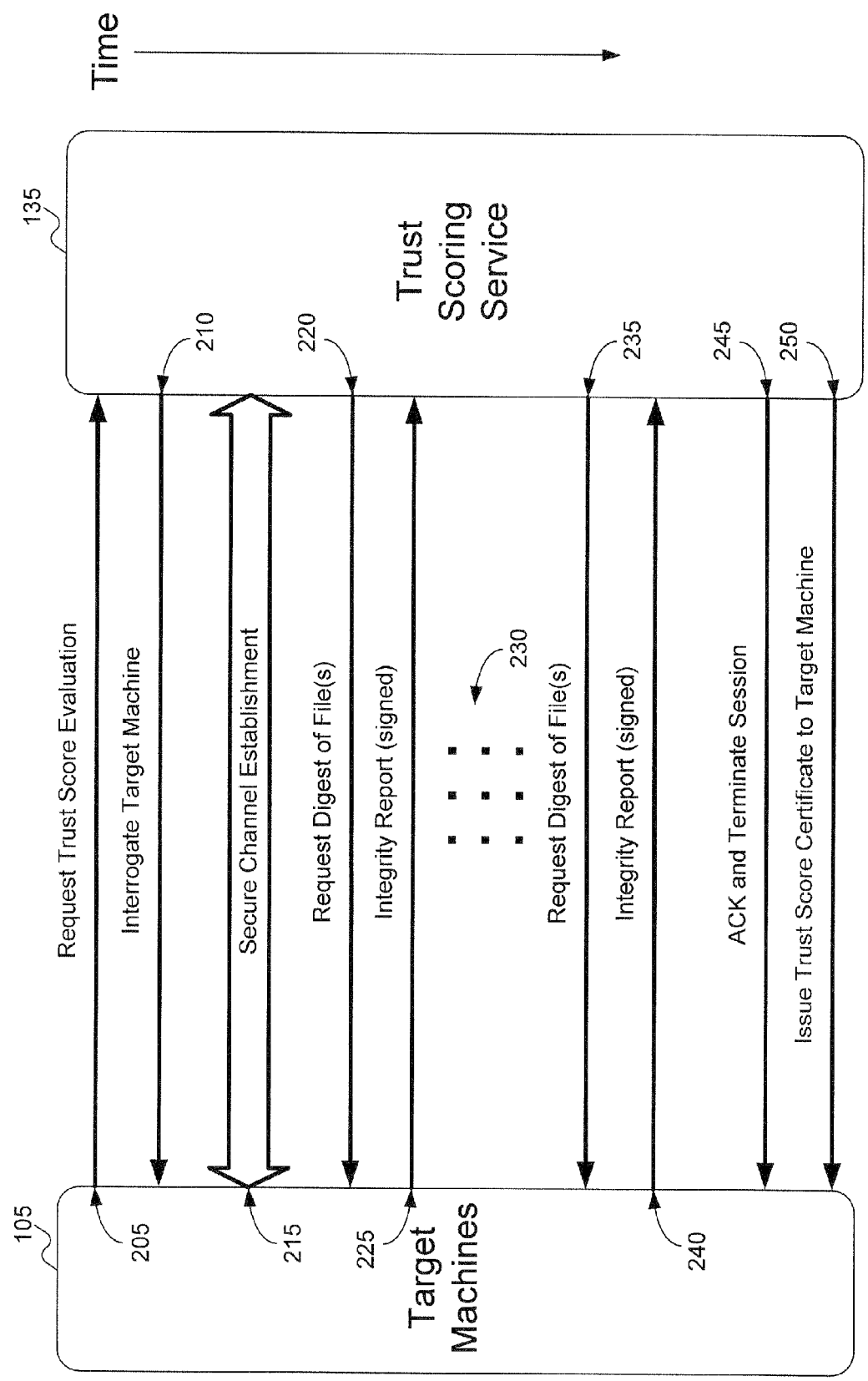
FIG. 2 shows an operation flow of the procedure used to interrogate the target machines of FIG. 1, according to an embodiment of the invention.

FIG. 2 shows an operation flow of the procedure used to interrogate the target machines of FIG. 1, according to an embodiment of the invention. At step 205, target machine 105 can request a Trust Score Evaluation from Trust Scoring Service 135. The requesting machine can provide Trust Scoring Service 135 with a clear identity of the machine (for example, an X.509 identity certificate, which is a convention to denote fields within the certificate). At step 210, in response to the request, Trust Scoring Service 135 can send an Initialization Message to signal the start of the interrogation of target machine 105.

At step 215, Score Evaluation Server 150 (of FIG. 1) can request target machine 105 to establish a Secure Channel, which provides mutual authentication and end-to-end confidentiality. This is done using the identity-object (e.g., the X.509 identity certificate of target machine 105). The aim is to establish strong mutual-authentication between Score Evaluation Server 150 (of FIG. 1) and target machine 105. But a person skilled in the art will recognize that the Secure Channel is not necessary: provided the data exchanged between Target Machine 105 and Trust Scoring Service 135 is appropriately protected (for example, using digital signatures or code-signing), the Secure Channel can be omitted.

The Score Evaluation Server 150 (of FIG. 1) then uses digest collector software to compute a digest of the files and data elements on target machine 105 (as determined by the Integrity Profile in Profile Database 160, of FIG. 1). If the digest collector software is not present already at target machine 105, Score Evaluation Server 150 (of FIG. 1) can push a run-time digest collector software down to target machine 105 (through the Secure Channel). Alternatively, digest collector software can be run from the Score Evaluation Server 150 (of FIG. 1), for example, in an applet or Active-X-like module, avoiding the need to install software on target machine 105. The digests can also be provided by target machine 105 at the time the trust score evaluation is requested in step 205.

Score Evaluation Server 150 (of FIG. 1) can request the digest computation of the various files and data elements in multiple rounds (for example as shown at 220, 225, 230, 235, and 240) or it can request and receive digests for all the necessary files and data elements in a single round. At the end of the interrogation step, Score Evaluation Server 150 (of FIG. 1) can instruct target machine 105 to terminate the Secure Channel as shown at 245. Alternatively, Score Evaluation Server 150 (of FIG. 1) can continue the Secure Channel until the Trust Score Certificate 130 (of FIG. 1) has been issued to target machine 105 at 250. If the digest collector software was installed on target machine 105, the digest collector software can be left installed on target machine 105, or the digest collector software can be uninstalled, as desired.

Finally, Score Evaluation Server 150 (of FIG. 1), or another entity that is part of Trust Scoring Service 135, can issue Trust Score Certificate 130 (of FIG. 1) to target machine 105, identifying it in the certificate.

Trust Score Certificate 130 (of FIG. 1) issued by Trust Scoring Service 135 to target machine 105 can have a number of information fields. Trust Score Certificate 130 can include the following:

Issuer: This is the identity of Trust Scoring Service 135. This could be a well known name, URL, or the certificate-serial-number of the Trust Scoring Service signing certificate.

Trust Score Certificate serial number: This is the serial number of the issued certificate containing the trust score.

Target machine identity: This is the identity of the scored target machine Examples of such identities can include the hash or serial-number of the machine's X.509 identity certificate.

Issuance date and time: This is the date and time of the issuance of the current Trust Score Certificate.

Expiration date and time: This is the expiration time of the current Trust Score Certificate.

Trust Score value: This is the result of the evaluation of the target machine by the Trust Scoring Service. This can be an integer value in a range of 0 to 1000, depending on the Integrity Profile. A person skilled in the art will recognize that other scales can be used for the Trust Score value.

Basis value: This is the basis for computing the Trust Score Value, indicating its relative trustworthiness.

Integrity Profile ID: This is the ID-number of the Integrity Profile (i.e., checking rules or policies, for example, to identify which files/elements should be analyzed) used by Trust Scoring Service 135 in the evaluation of target machine 105. This information can be used at a later time to verify the specific rules or polices applied with regards to target machine 105.

Location of updated certificate: This is a network location (e.g., URL, IP address, etc.) where a more up-to-date Trust Score Certificate (for the same target machine) might be available. This allows a consumer of the current Trust Score Certificate to check if a newer certificate exists.

Location of revocation status server: This is the network location (e.g., URL, IP address, etc.) of a Revocation Status Server which can indicate whether a given Trust Score Certificate is still valid (un-revoked).

Pointer to Issuer Certificate: This is a network location (e.g., URL, IP address, etc.) of a copy of the issuer's certificate (i.e., the Trust Scoring Service provider certificate).

Digital-signature signing algorithm: This is the algorithm name and/or ID of the algorithm used to sign the current Trust Score Certificate.

Digital signature: This is the actual cryptographic digital signature of the Issuer (computed over the entire Trust Score Certificate).

It is important to note that a newer Trust Score Certificate with a higher trust score does not automatically invalidate an older (but still valid) Trust Score Certificate with a lower trust score. An explicit action must be made by either target machine 105 or Trust Scoring Service 135 to revoke any unexpired certificate. Also, Trust Score Certificate 130 (of FIG. 1) need not contain any cryptographic keys. This type of certificate is also known as an attribute certificate in the X.509 standard.

Figure 3:
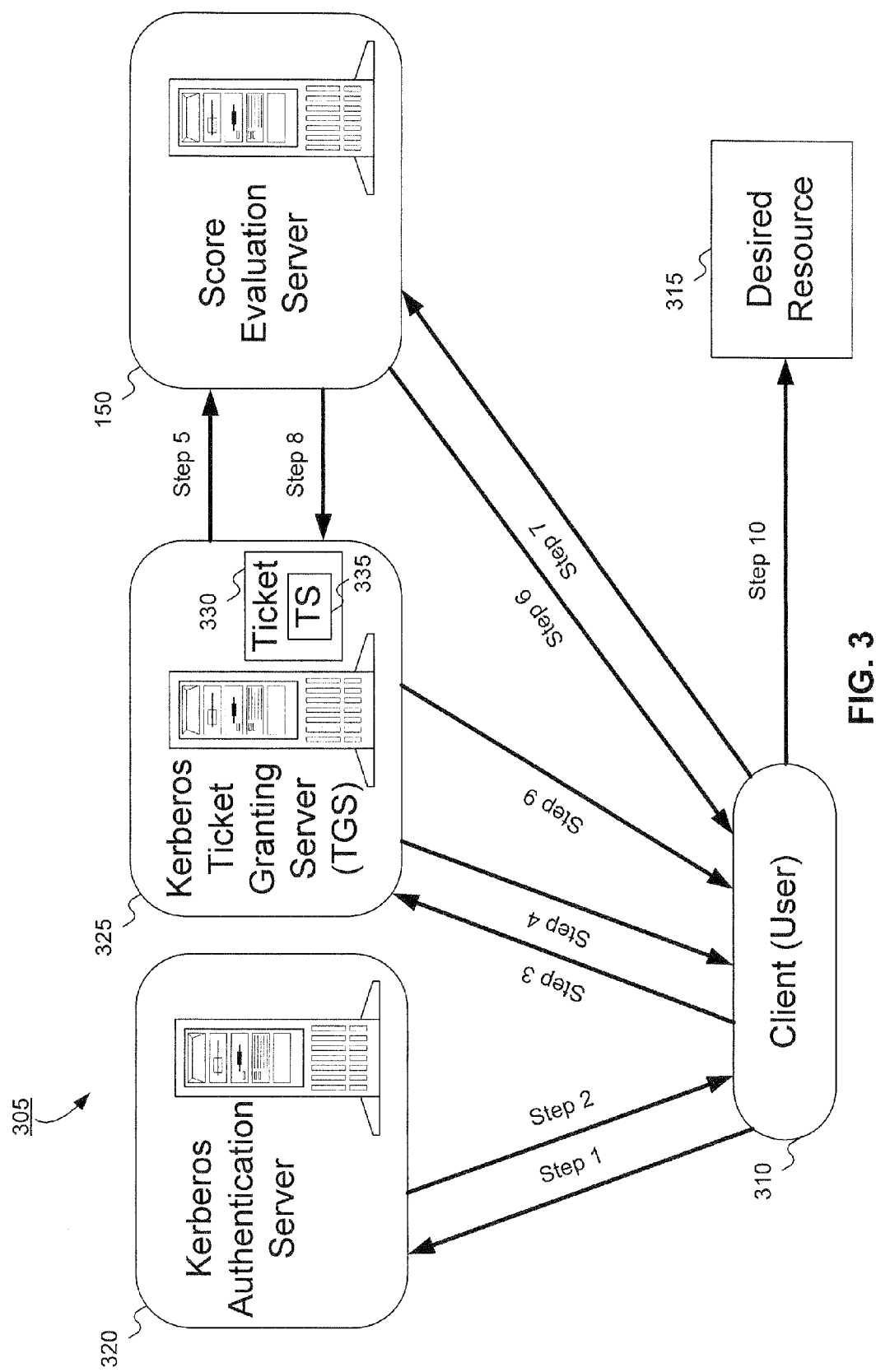
FIG. 3 shows a Kerberos system with a Score Evaluation Server, according to an embodiment of the invention.

FIG. 3 shows a Kerberos system with a Score Evaluation Server, according to an embodiment of the invention. Kerberos tickets can be augmented with a trust score, reflecting the integrity evaluation result of a given client machine. In the Kerberos Authentication System 305, client (or user) machine 310 seeks to access a desired resource (e.g., 315, which can be on a network), which is first authenticated by Kerberos Authentication Server 320. After being authenticated, Kerberos Authentication Server 320 can invoke Kerberos Ticket Granting Server 325 in order to request Ticket 330, which can be digitally signed and issued to client 310. Client 310 can receive Ticket 330, and then present Ticket 330 to a target resource (e.g., a server), at which point client 310 can be granted or denied access to resource 315. Ticket 330 can have an expiration date/time at which time client 310 should be authenticated again by Kerberos Authentication Server 320 and be assigned a new Ticket 330 by Kerberos Ticket Granting Server 325.

In one embodiment of the present invention, an augmentation to strengthen Kerberos Authentication System 305 includes performing an integrity evaluation of client machine 310 using Score Evaluation Server 150. Thus, besides the client's credential being authenticated by Kerberos Authentication Server 320, Kerberos Ticket Granting Server 325 can invoke Score Evaluation Server 150 to scan/evaluate client machine 310 and issue Trust Score 335 for it. As a result, Trust Score 335 can then be placed inside Ticket 330 before it is given to client 310. Furthermore, Kerberos Ticket Granting Server 325 can automatically include Trust Score 335 in new Ticket 330 upon the expiration of the date/time specified in Ticket 330.

Still referring to FIG. 3, client machine 310 can request to be authenticated at Step 1 and Step 2 and be issued with Ticket 330 at Step 3 and Step 4. These steps are the usual steps in Kerberos system 305. In Step 5, Kerberos Ticket Granting Server 325 can request Score Evaluation Server 150 to perform an integrity scan/evaluation of client machine 310. Score Evaluation Server 150 can perform the evaluation (at Step 6 and Step 7) using the method described with respect to FIG. 1 and FIG. 2 above, and can return Trust Score 335 to Kerberos Ticket Granting Server 325 at Step 8.

Kerberos Ticket Granting Server 325 can include the resulting Trust Score 335 in Ticket 330, can digitally sign Ticket 330, and can deliver Ticket 330 to Client 310 at Step 9. Client 310 can then present Ticket 330 to a resource server to access a resource at Step 10. The benefit of this proposed method is that the resource server can view Trust Score 335 within Kerberos Ticket 330, and can enforce a richer set of access policies based on the Trust Score value.

Figure 4:
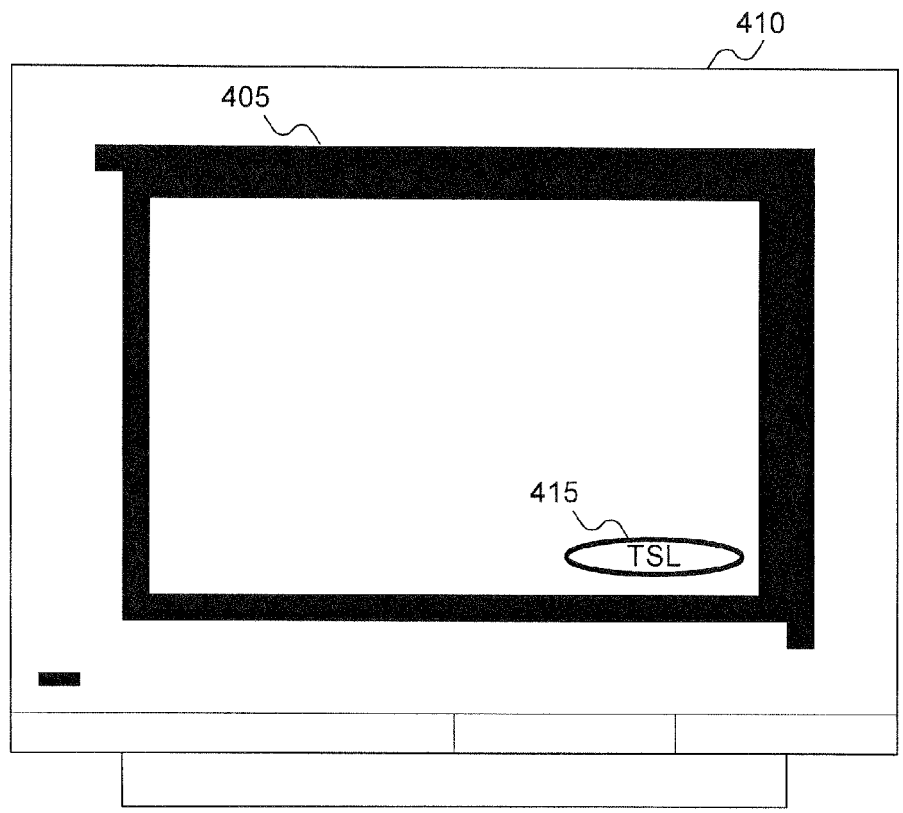
FIG. 4 shows an embodiment of a website including a Trust Score Certificate Logo, and a Trust Score value, according to an embodiment of the invention.
Figure 4:
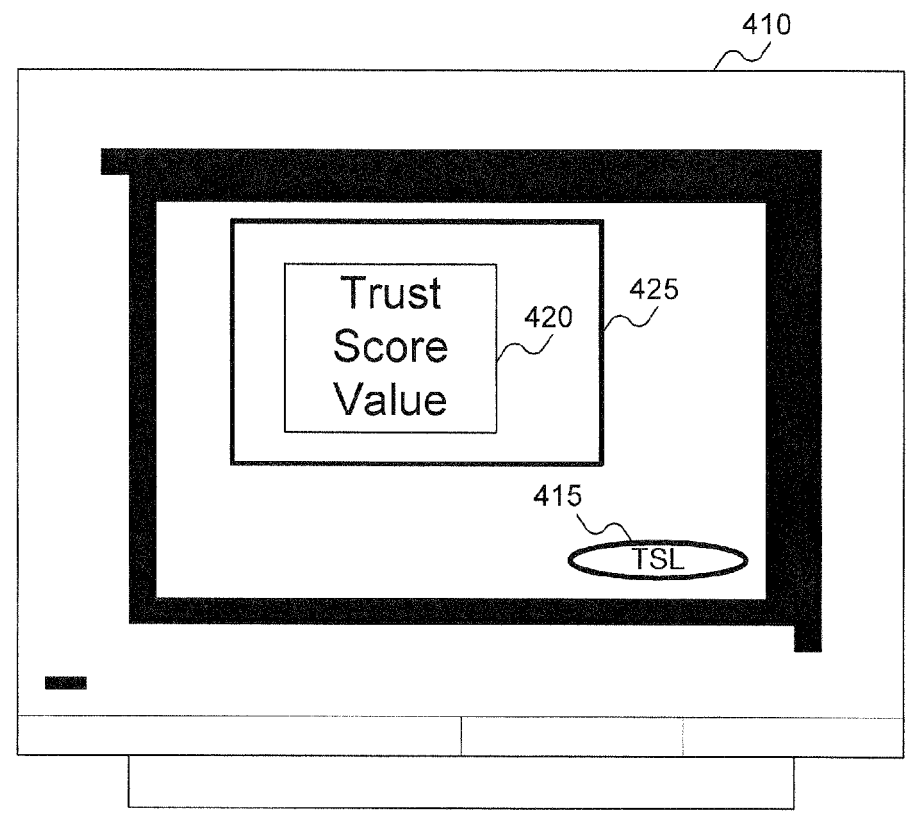

FIG. 4 shows an example of a website including a Trust Score Certificate Logo, and a Trust Score value, according to an embodiment of the invention. In this embodiment, Trust Scoring Service 135 (of FIG. 1) can be used to evaluate web server machines (not shown) that are used in customer-facing transactions. Such web-servers are used in many cases by online merchants (e.g., Amazon ®, PayPal®, eBay®, etc.). The result of an evaluation by Trust Scoring Service 135 can then be displayed in an accessible manner on website 405 (i.e., the home page) of the merchant using monitor 410.

A user or customer visiting website 405 would then click on Trust Score Certificate Logo 415 (shown as logo "TSL"), which could display a Trust Score value 420 (of the web-server) to the customer in pop-up window 425. The customer could then decide if he or she wishes to conduct a transaction with the merchant based on Trust Score value 420 of the web-server machine. This approach allows the customer to gauge a measure of the integrity of the web-server machine of the merchant prior to initiating or completing a transaction. The approach complements existing technologies used to verify the true identity of the merchant (e.g., SSL certificates).

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for evaluating the integrity of a web server machine, comprising:
    requesting a trust score evaluation of a web server machine;
    initiating an interrogation of the web server machine responsive to the trust score evaluation request;
    establishing a secure channel between the web server machine and a score evaluation server;
    generating at least one digest corresponding to at least one module of the web server machine;
    generating an integrity report to include the at least one digest;
    transmitting the integrity report to the score evaluation server;
    generating a trust score certificate responsive to the integrity report, the trust score certificate including a trust score for the web server machine, the trust score representing how many digests in the integrity report were verified by the score evaluation server and enabling a user to evaluate an integrity of the web server machine;
    transmitting the trust score certificate to the web server machine; and
    including a trust score certificate logo associated with the trust score certificate on a merchant website.

2. A method according to claim 1, wherein the integrity of the web server machine is determined prior to initiating a transaction by the user.

3. A method according to claim 1, wherein the integrity of the web server machine is determined prior to completing a transaction by the user.

4. A method according to claim 1, further comprising displaying information about the trust score certificate responsive to a click on the trust score certificate logo.

* * * * *